United States Patent [19]

Krude et al.

[11] 4,083,201
[45] Apr. 11, 1978

[54] CONSTANT VELOCITY UNIVERSAL JOINT

[75] Inventors: Werner Krude, Neunkirchen; Alfons Jordan, Hennef, both of Germany

[73] Assignee: Uni-Cardan AG, Lohmar, Germany

[21] Appl. No.: 703,131

[22] Filed: Jul. 7, 1976

[30] Foreign Application Priority Data

Jul. 11, 1975 Germany .............................. 2531009

[51] Int. Cl.² .......................... F16D 3/33; F16D 3/30
[52] U.S. Cl. ............................................ 64/21; 64/7; 64/8
[58] Field of Search ................................... 64/21, 8, 7

[56] References Cited
U.S. PATENT DOCUMENTS

| 3,362,192 | 1/1968 | Orkin | 64/21 |
| 3,464,232 | 9/1969 | Hutchinson | 64/21 |
| 3,613,397 | 10/1971 | Okoshi | 64/21 |
| 3,789,624 | 2/1974 | Camasso | 64/21 |
| 3,982,840 | 9/1976 | Grosseau | 64/21 |

Primary Examiner—Benjamin W. Wyche
Assistant Examiner—R. C. Turner
Attorney, Agent, or Firm—Edmund M. Jaskiewicz

[57] ABSTRACT

A constant velocity universal joint has an outer joint member with a cavity therein and an inner joint member within the cavity. A plurality of torque transmitting balls are positioned within opposed grooves formed in the facing surfaces of the inner and outer joint members. The balls are retained in a ball plane by a cage which has an inner concave surface guided upon a convex spherical surface of the inner joint member and an outer spherical surface guided within a spherical surface of the cavity. A portion of the outer face of the cage has a cylindrical configuration and is so positioned on the cage that the axis of the cylinder forms an angle with respect to the axis of the cage. The diameter of the cylindrical portion is less than the opening in the outer joint member to the cavity.

3 Claims, 3 Drawing Figures

CONSTANT VELOCITY UNIVERSAL JOINT

The present invention relates to constant velocity universal joints, more particularly, to the ball retainer cage so as to facilitate assembly of such a universal joint.

A known construction of a constant velocity universal joint comprises an outer joint member having a cavity therein with a cylindrical surface on the wall of the cavity and a plurality of grooves formed in the cavity surface. An inner joint member is positioned within the outer joint member and is provided with a number of grooves in its outer surface corresponding to and opposed from the joint member grooves to form pairs of opposed grooves. Torque transmitting balls are positioned in the opposed grooves and a cage between the joint members has a plurality of openings therein to retain the balls in a plane which is perpendicular to the axis of the cage and which bisects the angle between the joint members. The cage has a partial spherical surface on its outer face which is guided on the spherical surface of the outer joint member cavity. The cage is further provided with a concave spherical surface on its inner face which is guided upon a convex spherical outer surface of the inner joint member. The centers of the cage spherical surfaces are eqidistant on opposite sides of the ball plane.

A universal joint as described above has the disadvantage that the joint can be assembled only if either the outer or the inner joint member is of a two-piece construction since with a one-piece outer joint member the cage can be assembled only if the cage is pivoted through an angle of about 90° with respect to its axis of rotation in order to be inserted into the outer joint member. The pivoting of the cage through about 90° can be accomplished only if the inner joint member and the shaft connected to it are separate components. If the inner joint member is integral with the shaft it is then necessary to introduce this integral unit together with the cage assembled thereon into the outer joint member. In such a construction, the outer joint member must have a two-piece or split construction. Further, in both types of universal joint the torque transmitting balls can be assembled from outside the joint only by bending the joint through an angle greater than its normal bending angle.

It is therefore the principal object of the present invention to provide an improvement in such a constant velocity universal joint which reduces production costs and simplifies assembly.

It is another object of the present invention to provide in such a universal joint a ball retainer cage having a construction which facilitates assembly of the universal joint and avoids the necessity of making either of the joint members of two-piece construction.

According to one aspect of the present invention such a constant velocity universal joint as described above is provided with a ball retainer cage which has a cylindrical region on its outer surface such that the axis of the cylindrical region forms an angle with respect to the axis of the cage. In addition, the diameter of the cylindrical region is less than the diameter of the opening to the cavity in the outer joint member.

A particular advantage of the present invention is the significant reduction in production and manufacture costs since both the outer and inner joint members can now be made integrally with their respective input and output shafts. The outer joint member thus does not require an additional flange or any further structure for the concentric alignment and connecting of fastener elements such as bolts and the like. For the inner joint member the torque transmitting splined construction between the shaft and joint member as well as the attendant securing means can now be eliminated.

It is further pointed out that the present invention permits the universal joint to be assembled in the axial direction but no additional structure is necessary to prevent axial dislocation of the inner joint member with respect to the outer joint member.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications will be described in detail.

Figure 1:
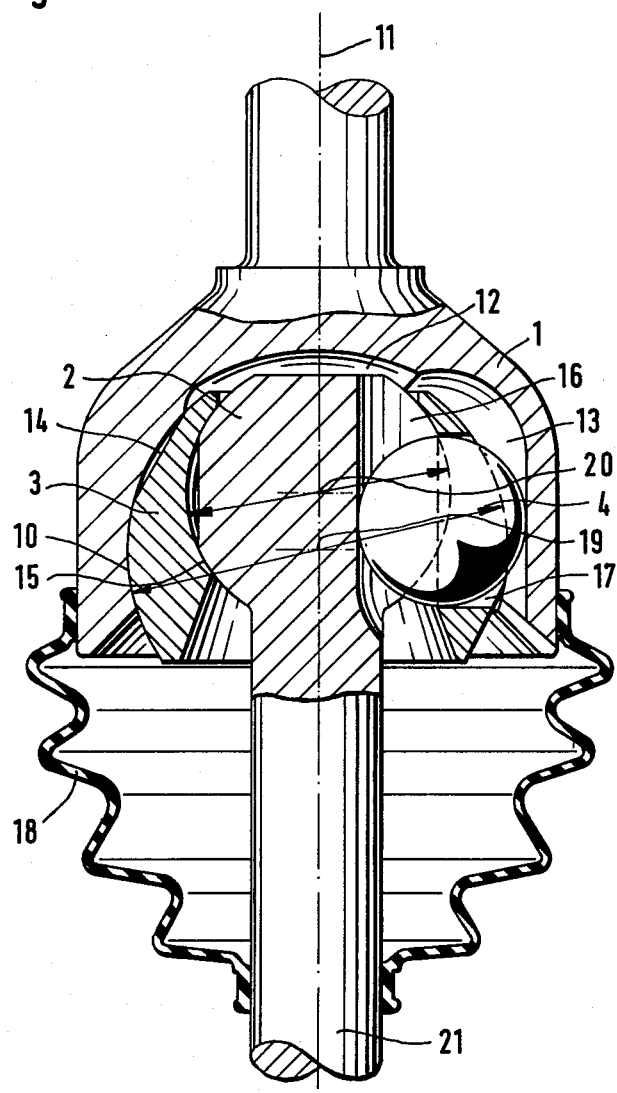
FIG. 1 is a longitudinal sectional view of a constant velocity universal joint according to the present invention.

In FIG. 1 there is illustrated a fixed or non-sliding constant velocity universal joint comprising an outer joint member 1 having a spherical cavity 12 therein. The cavity 12 opens outwardly of the outer joint member at opening 6. A plurality of circumferentially spaced substantially axially extending grooves 13 which are substantially parallel with the axis of rotation 11 of the joint are formed in the wall of the cavity 12. An inner joint member 2 is positioned within the outer joint member in its assembled condition and has an outer spherical surface 15 in which are formed a plurality of circumferentially spaced axially extending substantially parallel grooves 16. A cage 3 is positioned between the outer and inner joint members and has a concave spherical surface on its inner face which is guided upon the spherical surface 15 of the inner joint member. On the outer surface of the cage 3 there is formed a partial convex spherical surface 10 which is guided within the spherical cavity 12 of the outer joint member. The centers 19 and 20 of the outer spherical surface 10 and the inner spherical surface of the cage are equidistantly positioned on opposite sides of a plane passing through the centers of torque transmitting balls 4 which are seated in a plurality of circumferentially spaced openings 17 formed in the cage. The balls 4 are positioned in opposed pairs of grooves in the inner and outer joint members so as to transmit torque therebetween.

The cage 3 is also provided with a cylindrical portion 14 having a longitudinal axis 8. The longitudinal axis or axis of rotation of the cage 3 is designated at 9. The cavity opening 6 in the outer joint member 1 is formed with a beveled surface 7 which facilitates assembly of the joint. A pleated or corrugated flexible boot 18 is positioned between the outer joint member 1 and the shaft 21 to seal off the interior of the joint.

Figure 2:
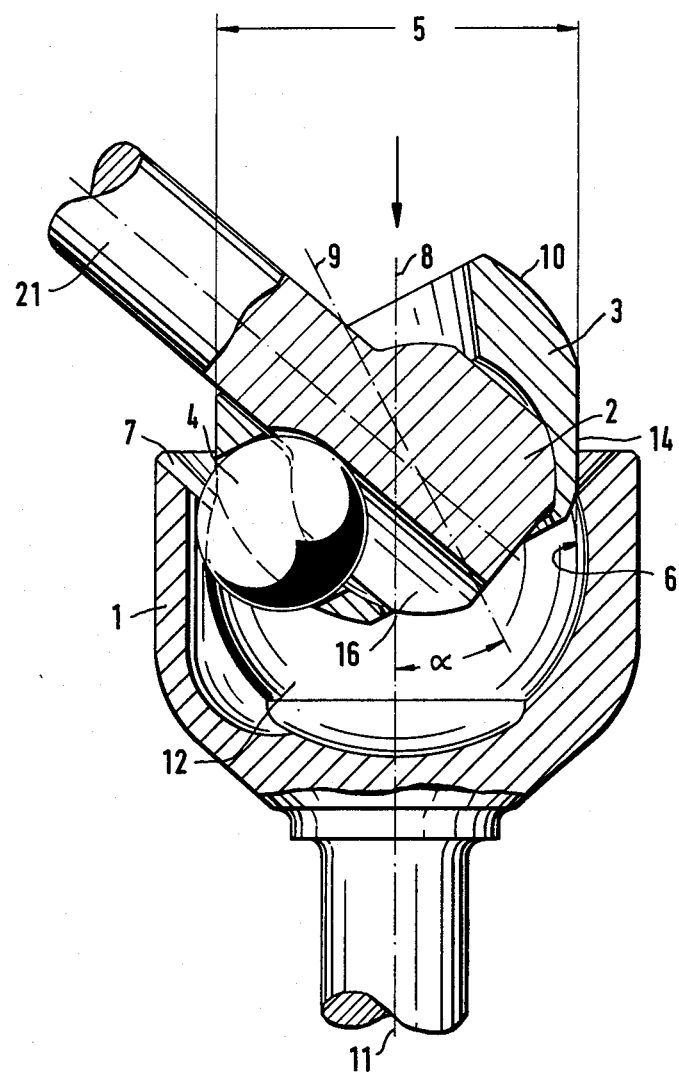
FIG. 2 is a view similar to that of FIG. 1 and showing the inner joint member, cage and torque transmitting balls in position for assmbly; and, FIG. 3 is a longitudinal sectional view of the ball retainer cage according to the present invention.

To assemble the universal joint, the cage 3 is mounted upon the inner joint member 2 and the torque transmitting balls 4 are then inserted radially inwardly from the exterior of the cage into the corresponding grooves 16 of the inner joint member 2. The inner joint member 2 is then pivoted to its maximum position within the cage 3 as shown in FIG. 2 such that the shaft 21 will contact an edge of the cage. The longitudinal axis 8 of the cylindrical portion 14 of the cage is then aligned with the rotational axis 11 of the outer joint member 1. The inner joint member and cage with balls unit is then pushed axially into the cavity 12 in the direction of the arrow until the center 19 of the outer spherical surface 10 of the cage 3 coincides with the center of the spherical cavity 12 of the outer joint member. In this position, the shaft 21 will be located in the beveled portion 7 of the outer joint member 1 which bevel is required during assembly only to provide sufficient space. Upon assembly, the components of the joint are pivoted back to their normal straight line position and the cavity opening is now closed. The boot 18 is fitted into position and the joint is now functional. It is pointed out that in the straight position and normal bending angles of the joint the inner joint member 2 can no longer be axially displaced with respect to the outer joint member 1.

Figure 3:
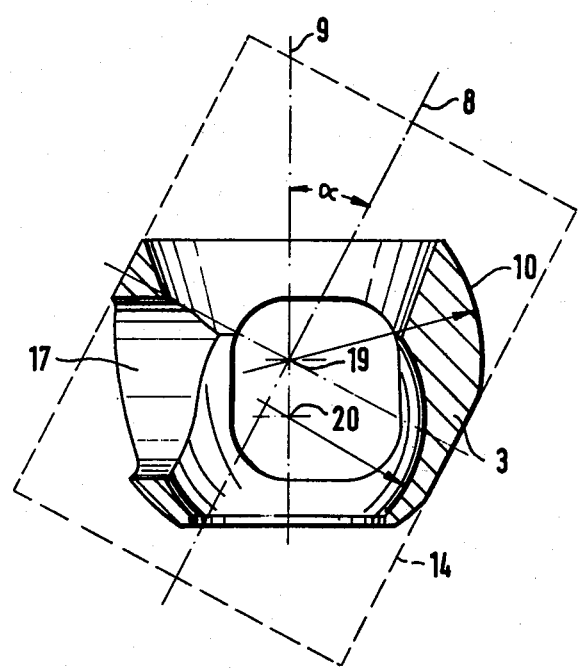

In FIG. 3 the cage 3 is illustrated with three openings 17 for use with three torque transmitting balls. While a cylindrical configuration 14 is illustrated in this embodiment of the invention, the surface 14 need not be cylindrical but may be of a configuration so as to be included within a cylinder surface generated about an axis of rotation 8.

The axis 8 of the cylindrical portion 14 intersects the rotational axis 9 of the cage 3 at the center 19 of the outer spherical surface 10. To facilitate assembly, it is preferable that the angle between the axes 8 and 9 is greater than one-half of the normal bending angle of the universal joint.

It is thus apparent that the present invention facilitates and simplifies the assembly of a joint wherein the assembly procedure merely comprises mounting the cage on the inner joint member, inserting the balls in the cage and introducing this assembly axially into the outer joint member. During this axial introduction into the outer joint member it is only necessary to assure that the shaft of the inner joint member is bent out at a sufficient angle to permit the longitudinal axis of the cylindrical cage region to coincide with the longitudinal axis of the outer joint member. In addition, the transmission shaft may now be assembled upon or removed from the vehicle should some components be worn or damaged without the necessity of also removing the outer joint member which, in the case of a fixed wheel joint, is connected to the axle pin.

The present invention may also be applied to relatively large universal joints wherein the inner joint member for reasons of economy is initially constructed in two components which are joined to form a unit prior to assembly.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint member having a cavity therein and an opening thereto, said cavity having a spherical surface and there being a plurality of grooves in said spherical surface, an inner joint member within said outer joint member and having a plurality of grooves in its outer surface corresponding in number to and opposed from said outer joint member grooves to define pairs of opposed grooves, a plurality of balls between said joint members with each ball being in a pair of opposed grooves, a cage between said joint members and having a plurality of openings therein to retain said balls in a plane which is perpendicular to the axis of the cage and which bisects the angle between the joint members, said cage having a first spherical surface on its outer face guided on said spherical surface of the outer joint member and a second sperical surface on its inner face, said inner joint member having a covex spherical outer surface coacting with said cage second spherical surface, the centers of said first and second cage spherical surfaces being equidistant on opposite sides of the ball plane, a portion of the outer face of said cage being cylindrical and the axis of said face portion forming an angle with the axis of the cage, the diameter of said cylindrical portion being less than the diameter of the opening in said outer joint member.

2. A constant velocity universal joint as claimed in claim 1 wherein the axis of said cylindrical portion and the axis of said cage intersect at the center of said cage first spherical surface.

3. A constant velocity universal joint as claimed in claim 1 wherein the angle of intersection of the axes of the cylindrical portion and the cage is greater than one-half of the bending angle of the joint.

* * * * *